(12) United States Patent
Weber et al.

(10) Patent No.: US 10,716,190 B2
(45) Date of Patent: *Jul. 14, 2020

(54) ADAPTIVE VISUAL INTELLIGENCE OUTDOOR MOTION/OCCUPANCY AND LUMINANCE DETECTION SYSTEM

(71) Applicant: Hubbell Incorporated, Shelton, CT (US)

(72) Inventors: Theodore Eric Weber, Round Rock, TX (US); Terrence Robert Arbouw, Georgetown, TX (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/680,801

(22) Filed: Nov. 12, 2019

(65) Prior Publication Data
US 2020/0146127 A1    May 7, 2020

Related U.S. Application Data

(63) Continuation of application No. 15/145,296, filed on May 3, 2016, now Pat. No. 10,477,647.

(Continued)

(51) Int. Cl.
| | |
|---|---|
| *G06K 9/62* | (2006.01) |
| *H05B 47/105* | (2020.01) |
| *G06T 7/269* | (2017.01) |
| *G06T 7/246* | (2017.01) |
| *G06T 7/215* | (2017.01) |

(52) U.S. Cl.
CPC .......... *H05B 47/105* (2020.01); *G06K 9/6256* (2013.01); *G06T 7/215* (2017.01); *G06T 7/246* (2017.01); *G06T 7/269* (2017.01); *G06T 2207/30232* (2013.01)

(58) Field of Classification Search
CPC ......... G06T 7/215; G06T 7/246; G06T 7/269; G06T 2207/30232; G06K 9/6256; H05B 37/0227
See application file for complete search history.

(56) References Cited

U.S. PATENT DOCUMENTS

| | | | | |
|---|---|---|---|---|
| 4,853,678 A * | 8/1989 | Bishop, Jr. | ............... | G09F 27/00 340/286.01 |
| 9,082,018 B1 * | 7/2015 | Laska | .................. | H04N 21/431 |

(Continued)

*Primary Examiner* — Alexander H Taningco
*Assistant Examiner* — Kurtis R Bahr
(74) *Attorney, Agent, or Firm* — Michael Best & Friedrich, LLP (57) ABSTRACT

A sensor fixed atop a structure, The sensor including an image-capturing device configured to collect image data and an electronic processing device. The electronic processing device is configured to receive, via the image-capturing device, the image data, determine a wobble state value of the image data, filter the image data when the wobble state value is approximately equal to a first wobble state threshold, perform a first timeout for a first predetermined time period when the wobble state value is approximately equal to a second wobble state threshold, and increment the first timeout to a second timeout for a second predetermined time period when the wobble state value is approximately equal to the second wobble state threshold following the first timeout.

17 Claims, 8 Drawing Sheets

Related U.S. Application Data (60) Provisional application No. 62/155,929, filed on May 1, 2015.

(56) References Cited

U.S. PATENT DOCUMENTS

| | | |
|---|---|---|
| 9,082,202 B2 | 7/2015 | Kovesi et al. |
| 9,367,925 B2 | 6/2016 | Kovesi et al. |
| 2005/0165517 A1* | 7/2005 | Reich ............... A63H 27/04 701/11 |
| 2007/0109407 A1* | 5/2007 | Thompson ....... G08B 13/19632 348/143 |
| 2008/0021897 A1* | 1/2008 | Lepre ................. G06F 16/285 |
| 2009/0067716 A1* | 3/2009 | Brown ............... G06K 9/00597 382/173 |
| 2012/0044350 A1* | 2/2012 | Verfuerth ............. H05B 47/105 348/143 |
| 2012/0051651 A1* | 3/2012 | Yamaoka ................ G06F 3/011 382/195 |
| 2012/0194697 A1* | 8/2012 | Hasegawa .......... G06K 9/00355 348/223.1 |
| 2013/0034203 A1* | 2/2013 | Wang ..................... A61B 6/03 378/41 |
| 2013/0170696 A1* | 7/2013 | Zhu ......................... G06K 9/68 382/103 |
| 2013/0170760 A1* | 7/2013 | Wang ................. G06K 9/00771 382/224 |
| 2014/0355895 A1* | 12/2014 | Xu ..................... G06K 9/6298 382/228 |

\* cited by examiner

ADAPTIVE VISUAL INTELLIGENCE OUTDOOR MOTION/OCCUPANCY AND LUMINANCE DETECTION SYSTEM

RELATED APPLICATION

This application is based on U.S. patent application Ser. No. 15/145,296, filed May 3, 2016, which claims priority to U.S. Provisional Application Ser. No. 62/155,929, filed May 1, 2015, the disclosure of both of which is incorporated herein by reference in its entirety and to which priority is claimed.

BACKGROUND

Motion/occupancy sensors are known to provide an economical solution for controlling energy delivery to various electrical systems, such as lighting systems in a residence, commercial building, outdoor area, or any other place where it is desired to limit energy delivery to those times when the controlled space is occupied. One of the primary benefits of utilizing occupancy sensors for this purpose is substantial energy savings which results in corresponding cost savings, not to mention conserving valuable natural resources. Occupancy sensors are often considered to be most suitable when the area to be controlled is intermittently occupied, for example, when a room is unoccupied for two or more hours per day, and where one or more lights in the area is regularly left ON when the space is unoccupied. This type of situation makes occupancy-based lighting control a very desirable solution for areas such as parking garages and exterior lighting applications. Studies have shown that Motion/Occupancy detection systems used to control parking garages and exterior lighting can provide energy savings of up to 30% to 60%, and possibly more.

In addition to providing a cost-effective method for reducing energy consumption, additional uses for occupancy sensors include security (e.g., by indicating that a particular area is occupied, or not), and reducing light pollution (e.g., by limiting the amount of lighting operated at night). Historically, due to reasons that include relatively low energy costs, security concerns, and the lack of a truly robust low-cost occupancy detection technology, the market has been reluctant to deploy occupancy detection for parking garage and outdoor lighting applications. This reluctance is waning, however. Recent code changes, such as to the California Energy Code (CEC), Title 24, and the addition of new wide-reaching energy-related standards, such as ASHRAE/IES 90.1, have led to strengthened language in Codes of many jurisdictions and led to the addition of more energy-delivery control requirements that now include parking garages and exterior lighting. These changes include, for example, adding a requirement for occupancy detection as a means of reducing lighting levels when these lighting zones are unoccupied. The development of a new robust luminance and motion/occupancy sensor capability for lighting applications provides a solution that addresses these new code and standard requirements, as well as additional concerns.

SUMMARY

According to one aspect of the present application, a control system based on Digital Image Processing is presented that provides a superior solution to those currently on the market. In accordance with at least one embodiment such digital image-based occupancy sensing uses a much higher resolution method compared to conventional alternatives. For example, a passive infrared (PIR) sensor is basically a 2-pixel camera that provides a yes/no decision. In accordance with an exemplary embodiment of the present application, however, a digital camera with greater than 100,000 pixels provides a much more robust solution. Both the PIR and the embodiment mentioned provide an indication of motion in the field of view. However, the additional information captured and processed by a Digital Signal Processor (DSP) allows for improved object Motion of Interest (MOI) detection and eliminates false detections.

According to this and other embodiments, by analyzing digital video data and removing selected background information, the system disclosed herein uses the change in the remaining image, and a characterization of that change, to determine if relevant movement has taken place in the field of view. According to further embodiments, additional processing on the image data is performed to increase the reliability of the system because there are many events that can result in image frame data modification that are not necessarily related to actual occupancy or MOI. Such events could potentially lead to inaccurate or erroneous MOI detection and are addressed by the additional processing. Situations that could lead to this type of erroneous MOI determination include sudden changes in light, such as lightning flashes or vehicle headlights sweeping across the field of view, falling snow or rain, insects on or near the sensor, and moving trees, grass or other foliage.

Figure 1:
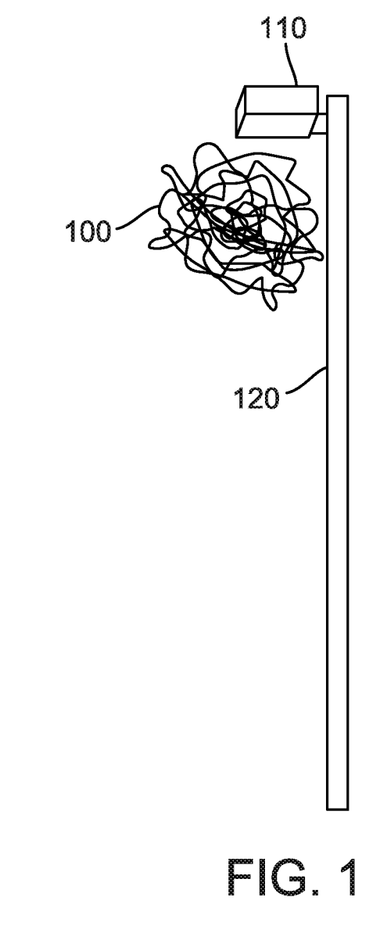
FIG. 1 is an illustration of an exemplary issue addressed by one or embodiments.
Figure 2:
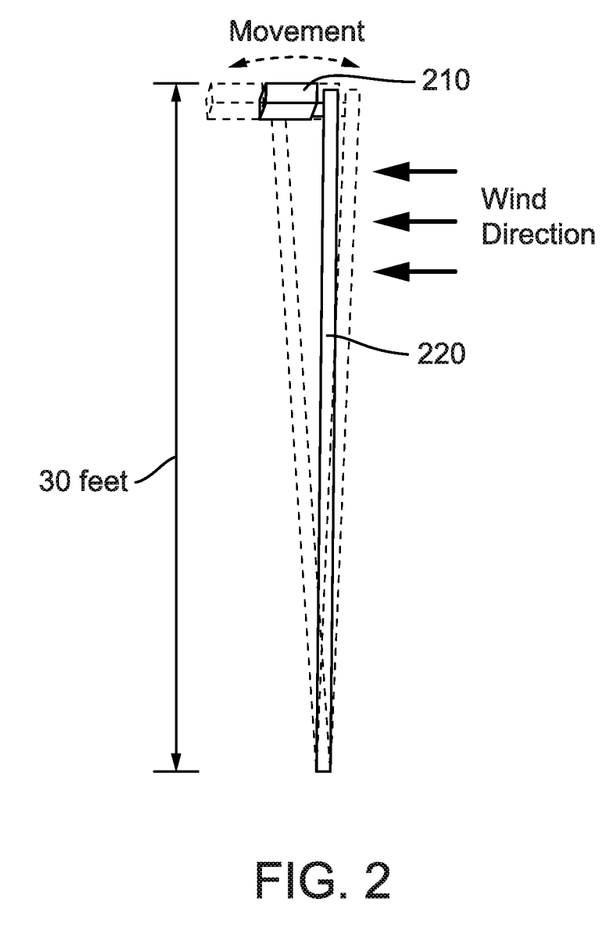
FIG. 2 is an illustration of a further exemplary issue addressed by one or embodiments.

FIGS. 1 and 2 respectively illustrate two exemplary issues addressed by embodiments of this application. FIG. 1 shows a large number of swarming insects 100 flying in close proximity to an outdoor light fixture 110 equipped with an imager, such as a camera, (not shown). In this embodiment the fixture and sensor are fixed atop a pole 120 of, for example, a street light. This type of motion, i.e., the random motion of one or more swarming insects, is exemplary of the type of motion that is typically not intended to result in energy-delivery, e.g., the turning the street light ON. Moreover, recent scientific studies have shown that blue-light LEDs, which are becoming more and more common in lighting fixtures, attract more flying insects than do other types of light sources, such as yellow-hued sodium lights. Even a small number of bugs or insects can deceive an image-based detector into determining an occupancy condition as the bugs or insects are in motion and their proximity to the imager makes them appear much larger than they really are. This perspective-distance effect makes it difficult to differentiate the insects from relevant motion, such as vehicular or pedestrian traffic on the ground. In accordance with exemplary embodiments of this application, specific processing is performed on the image data to enable the system to distinguish this type of undesired motion from that which is desired to be used to turn ON the light.

Another situation addressed by exemplary embodiments of the application occurs when the pole, or other structure on which the sensor is mounted, does not remain stationary. For example, the pole may wobble, or sway, due to mechanical resonance imparted by incident wind force. The pole swaying will cause the imager to move, creating frame-to-frame changes of the image that, if significant enough, will result in a false detection of desired motion, e.g., MOI. In an exemplary embodiment illustrated in FIG. 2, a sensor (not shown) is mounted on the fixture 210 at the top of the pole 220. The sensor includes an imager which perceives significant apparent motion as the pole 220 sways back and forth as indicated by the dashed-line arrows. In accordance with embodiments of the application this non-useful relative motion perceived by the swaying sensor/imager is differentiated from the Motion Of Interest (MOI) so only detected MOI is used to control the light.

Other aspects will become apparent by considering the detailed description and accompanying drawings.

BRIEF DESCRIPTION OF THE DRAWINGS

The accompanying figures, where like reference materials refer to identical or functionality similar elements throughout the separate views, together with the detailed description below, are incorporated in and from part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before any embodiments are explained in detail, it is to be understood that systems, devices and methods in accordance with this application are not limited in their application to the details of construction and the arrangement of components set forth in the following description or illustrated in the appended drawings. The systems, devices and methods disclosed and claimed herein are capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 3A:
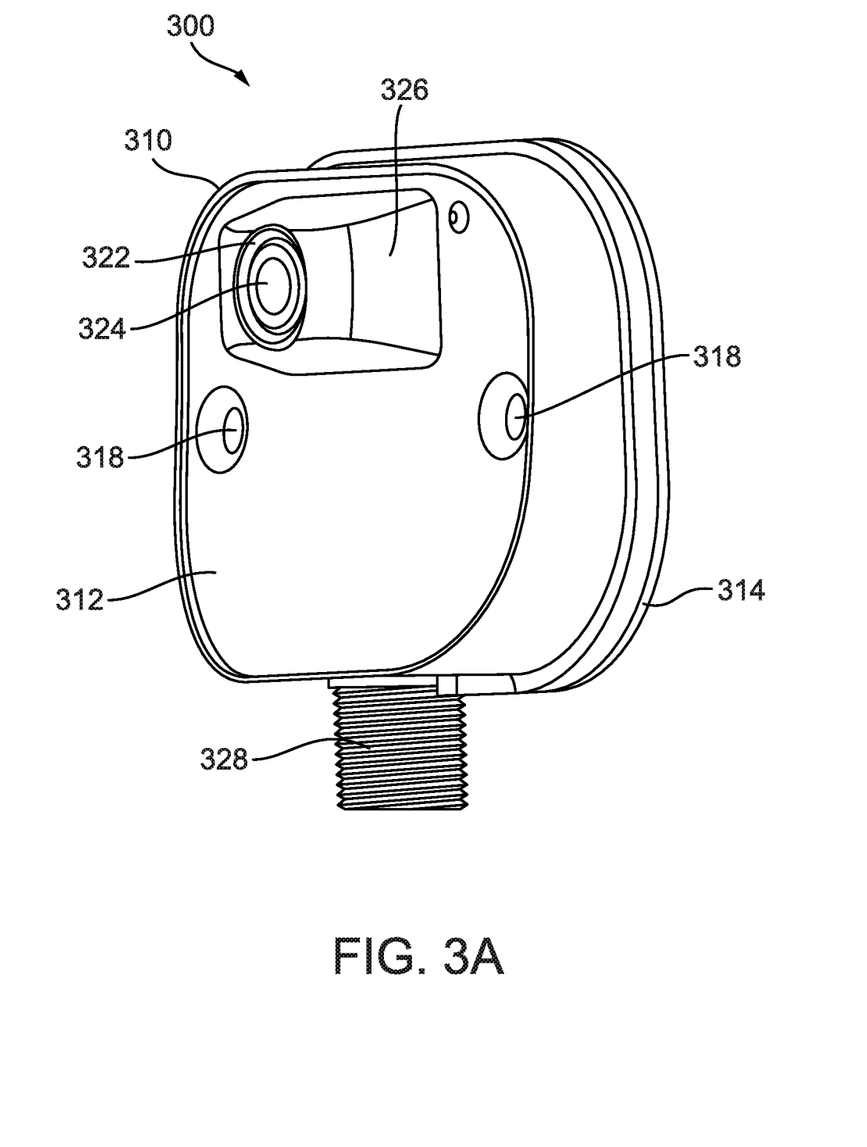
FIGS. 3A-3C illustrate a sensor head in accordance with one or more embodiments.
Figure 3B:
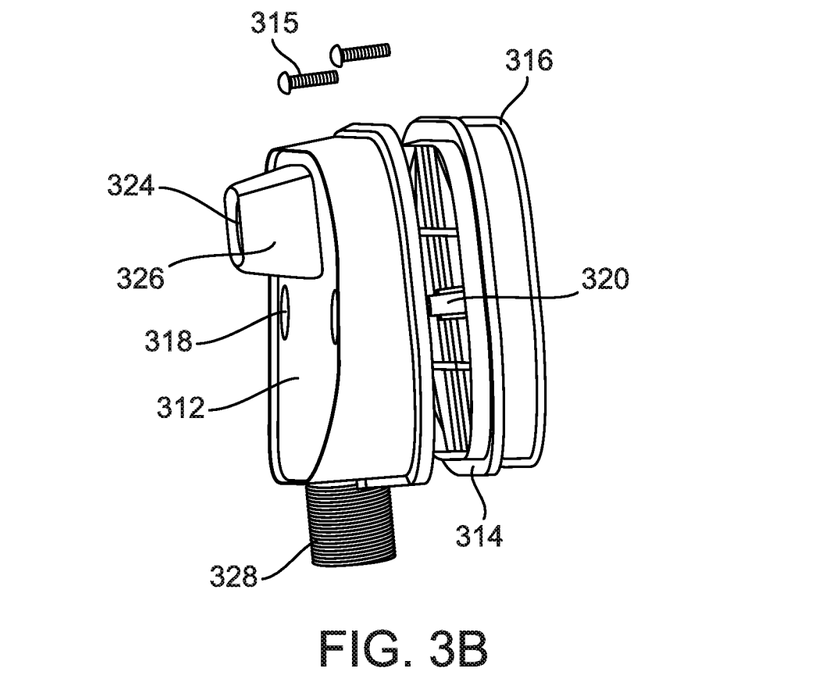
Figure 3C:
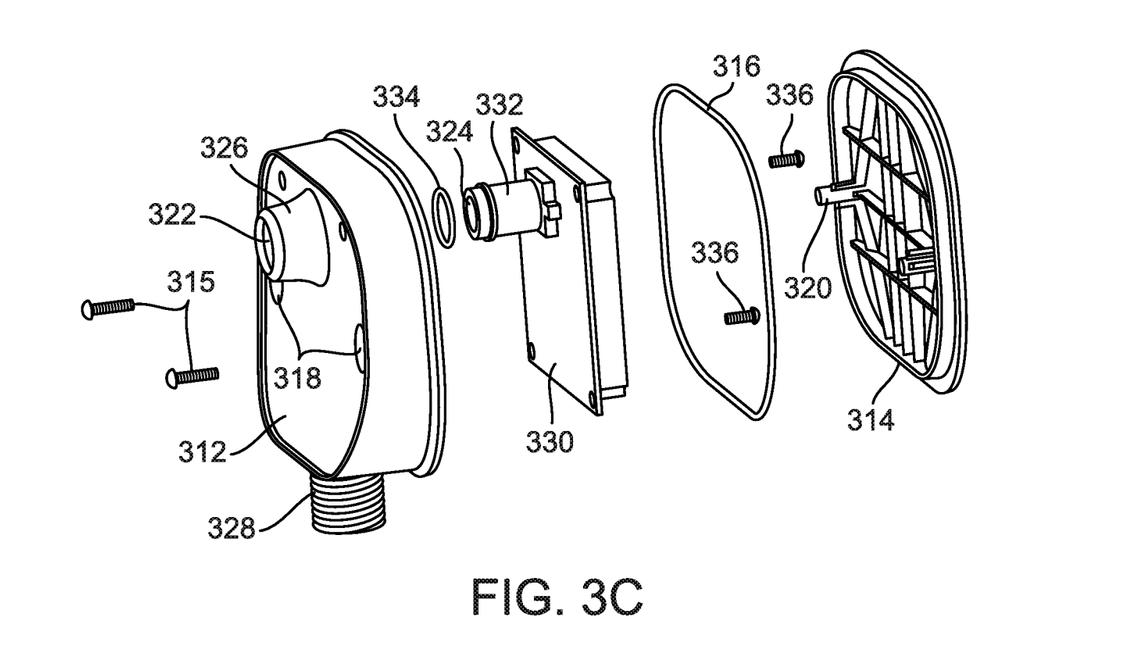

Referring to FIGS. 3A, 3B and 3C, a sensor 300 in accordance with one or more embodiments includes a housing 310 that encloses both light detection and image capturing components, as discussed further below. According to embodiments of this application, sensor 300 is mounted atop a pole, or on some other structure, to provide convenient "line of sight" for light and/or image detection components to accurately survey the area of interest, e.g., where people or other objects that create MOI would be moving.

Housing 310 includes a front portion 312 and rear cover 314. Rear cover 314 mates with front portion 312 to provide a weather tight seal to keep the electronic sensor components enclosed within housing 310 dry and free from adverse environmental conditions, such as rain, etc. In accordance with the embodiment shown, gasket 316 is provided around the periphery of rear cover 314 to provide a water tight seal between rear cover 314 and front portion 312. Front portion 312 and rear cover 314 are attached together using any suitable attachment mechanism, such as screws 315. Screws 315 are inserted through the front face of front portion 312 through mounting holes 318. Screws 315 pass through mounting holes 318 and mate with corresponding standoffs 320 on the inside surface of rear cover 314.

The front face of front portion 312 further includes window 322 through which a lens 324 or other optical component of an imaging sensor can view the area of interest. In the embodiment shown, lens 324 is disposed in a lens holder 332 attached to printed circuit board (PCB) 330. PCB 330 is mounted within housing 310 to an inner surface of front portion 312 using any suitable fastening means, such as mounting screws 336. Window 322 is provided within a protrusion 326 on the front face of front portion 312 of the housing. A small gasket 334 is provided between lens 324 and the interior surface of window 322 and protrusion 326 to provide a weather tight seal around window 322.

Threaded conduit (or connector) 328 allows sensor 300 to be easily connected and disconnected to its mounting location, such as the fixture control module of an outdoor luminaire. Conduit 328 is hollow and permits wiring to be provided to and from the detection components within sensor 300. For example, electric power and data can be provided to and from the sensor on wires passing through conduit 328 to PCB 330, or another device within housing 310. According to certain embodiments, data generated by PCB 330 and/or other detection components within housing 310 is carried on wires also provided through conduit 328. Alternatively, the data from the PCB or other components in housing 310 is outputted wirelessly to a wireless receiver using, for example, a Bluetooth transmitter.

Figure 4:
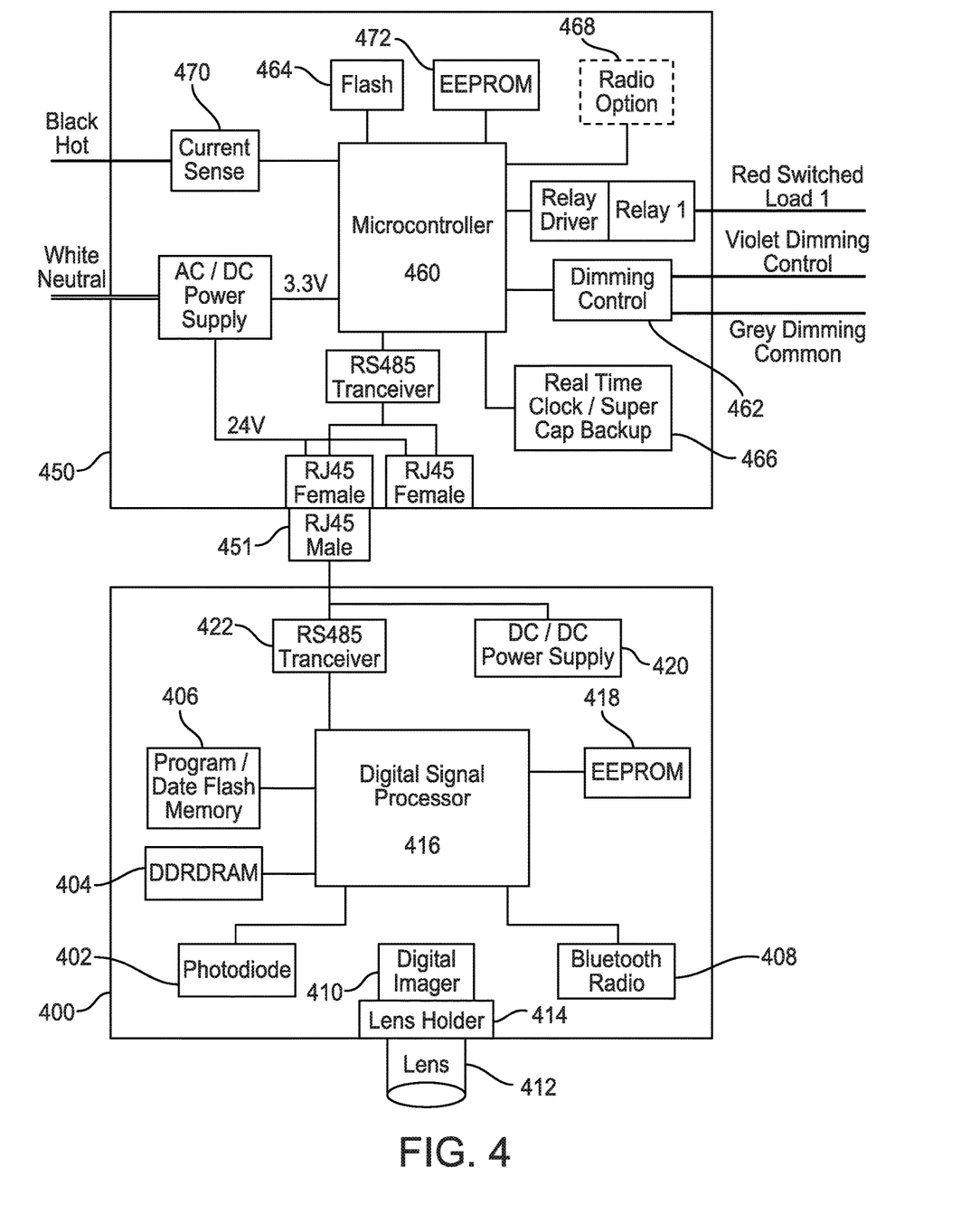
FIG. 4 is a block diagram showing components of a sensor module and a fixture control module in accordance with one or more embodiments.

Referring to FIG. 4, exemplary hardware and interface details consistent with at least one embodiment of a sensor and related system in accordance with the application is described. FIG. 4 is a block diagram illustrating one embodiment of various hardware components of a sensor module 400 and a fixture control module 450 in accordance with the present application. As shown, sensor module 400 includes a digital imager 410, such as a digital camera, or other image-capturing device, that can acquire a digital data representative of a physical scene, such as a parking lot, street, grounds around a building, or other area where lighting is often desired. Digital imager 410 receives the image through a lens 412 which is held in place with lens holder 414. Digital imager 410 captures the image data in any one or more known video/image file formats including, but not limited to MOV, VVF, g64MPEG, SVI, 3GPP, WMV, AVI, FLV and F4V, or another custom proprietary format, and provides the data to a digital signal processor (DSP) 416. DSP 416 performs various algorithms, discussed further below, to enable identification a motion of interest (MOI).

According to the embodiment shown in FIG. 4, within sensor module 400 DSP 416 is also connected to several other components, such as a photodiode 402, DDR DRAM memory device 404, Flash memory 406, EEPROM memory 418 and a Bluetooth radio 408 for communicating wirelessly with, for example, a user controlling the sensor operations via a cell phone and/or receiving data, such as image data or the results of the DSP processing algorithm(s).

Photodiode 402 is used to measure the ambient light at or near the sensor. That is, photodiode 402 is exposed directly to the exterior environment and converts ambient light to an electrical current signal which is provided to DSP 416. This signal is converted to a digital signal and processed by DSP 416. DSP 416 is also connected to a memory device, such as DDR DRAM device 404 for storing data that does not necessarily have to be maintained for long lengths of time, such as image data. Another type of memory device connected to DSP 416 is a flash memory device 406. Flash memory 406 is a non-volatile type of memory and is used to store the program and data used by the DSP to perform its processing algorithm(s). For example, flash memory 406 can include a USB memory device that can be selectively connected to the sensor for reprogramming the device. That is, if new parameters are needed based on the geographic location of the sensor installation, a new program can be input to the system by connecting a USB type flash memory device (406) that contains the needed software code and data. Also connected to DSP 416 in accordance with this exemplary embodiment is another type of reprogrammable memory device known as an electrically erasable programmable read-only memory (EEPROM) 418. EEPROM devices have much higher lifetime write cycle capability than Flash memory devices and are used for non-volatile storage of frequently changing variables used by the DSP. Examples of this type of variable include those related to adaptive sensitivity, adaptive timing and frame segment activity.

Sensor module 400 communicates with fixture control module 450 via cable 451, such a CAT5 cable with an appropriate RJ45 connector. The results of the processing by DSP 416 are sent to the fixture control module via cable 451 where this data is presented to a processing device, such as microcontroller 460. The microcontroller 460 controls the operation of the fixture using Relay Driver/Relay 1 461 to apply and remove power, and Dimmer Control 462 to modify the fixture lamp brightness. The microcontroller 460 makes decisions on the various actuator (relay and dimmer) states based on a number of factors including the MOI results received from the sensor module 400, operational schedules which may be stored in flash memory 464 and timed by real time clock 466, ambient light information received from sensor module 400 and external commands that may be received from the Bluetooth radio 408 via sensor module 400 or other radio option 468, such as Zigbee. The microcontroller 460 also senses power levels using current sense 470, periodically storing this and other variables including fixture power-on hours and relay statistics in EEPROM 472. The radio option 468 may also be used to communicate with other nodes in a wireless network.

Figure 5:
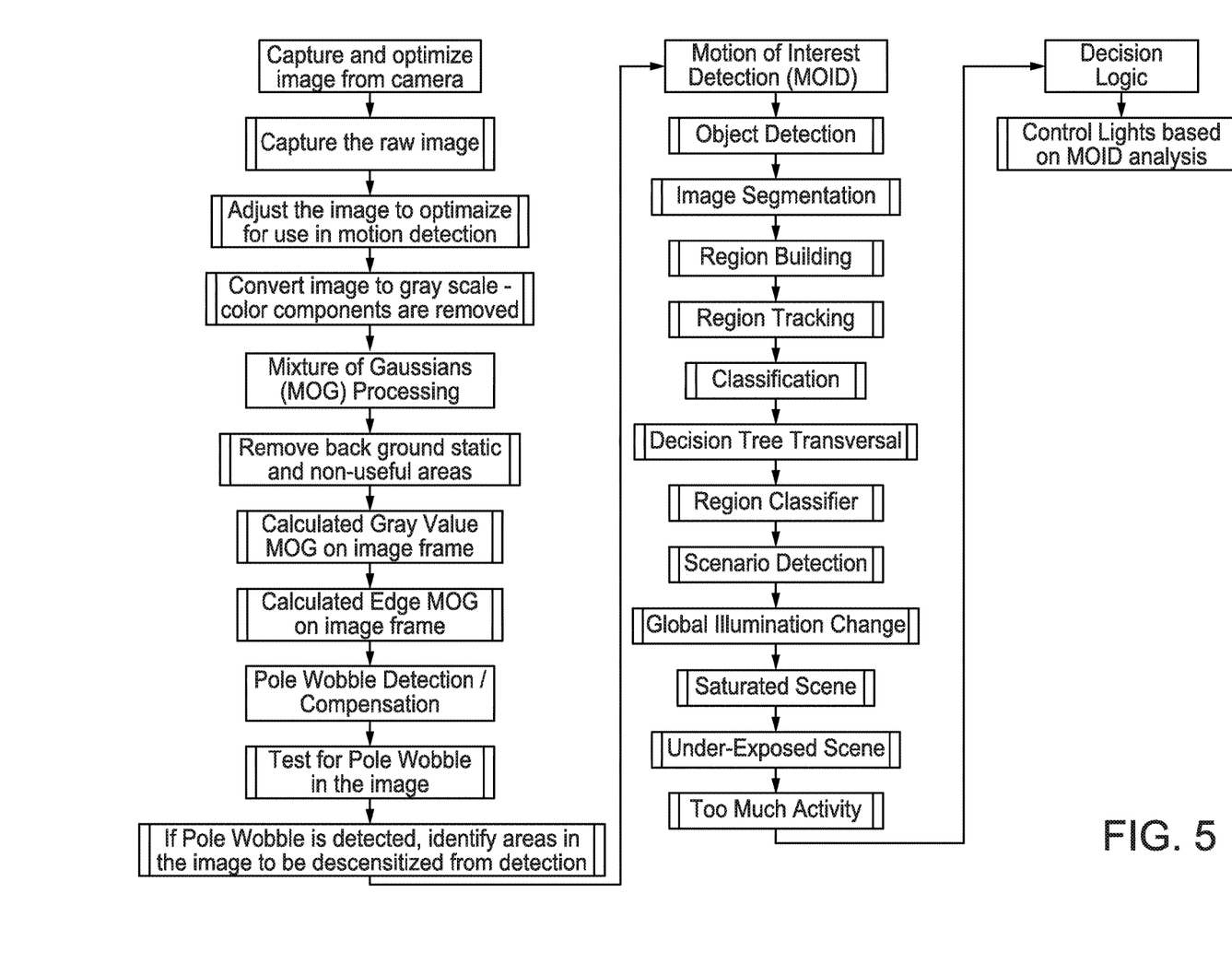
FIG. 5 is a process diagram for an algorithm used to process image data in accordance with one or more embodiments.

Referring to FIG. 5, and also described in the outline below, one embodiment for determining the motion of interest (MOI), for example, to control lighting loads based on predetermined criteria/conditions regarding that motion is illustrated in the form of a flow diagram.

1. Capture and optimize image from camera
   a. Capture the raw image
   b. Adjust the image to optimize for use in motion detection
   c. Convert image to gray scale—color components are removed
2. Mixture of Gaussians (MOG) Processing
   a. Remove background static and non-useful areas
   b. Calculate Gray Value MOG on image frame
   c. Calculate Edge MOG on image frame
3. Pole Wobble Detection/Compensation
   a. Test for Pole Wobble in the image
   b. If Pole Wobble is detected, identify areas in the image to be desensitized from detection
4. Motion of Interest Detection (MOID)
   a. Object Detection
      i. Image Segmentation
      ii. Region Building
      iii. Region Tracking
   b. Classification
      i. Decision Tree Transversal
      ii. Region Classifier
   c. Scenario Detection
      i. Global Illumination Change
      ii. Saturated Scene
      iii. Under-Exposed Scene
      iv. Too Much Activity
5. Decision Logic
   a. Control Lights based on MOID analysis According to one exemplary embodiment a sensor, for example, a sensor similar to sensor 300 described in regard to FIGS. 3 and 4, is provided on a light pole. The sensor includes a camera or other image-capturing device that captures image data with respect to an area of interest, such as a parking lot or a street corner. As mentioned above, however, many typical light poles, including a light pole consistent with the present embodiment, are subject to wobble caused by the wind or some other force. Accordingly, according to the present embodiment the image data captured by the image-capturing device is processed to account for and/or reconcile frame-to-frame data differences attributable to this wobble effect which potentially could lead to erroneous determination that a motion of interest (MOI) has occurred. As described below, a wobble detection algorithm is deployed for processing the image data.

Figure 6:
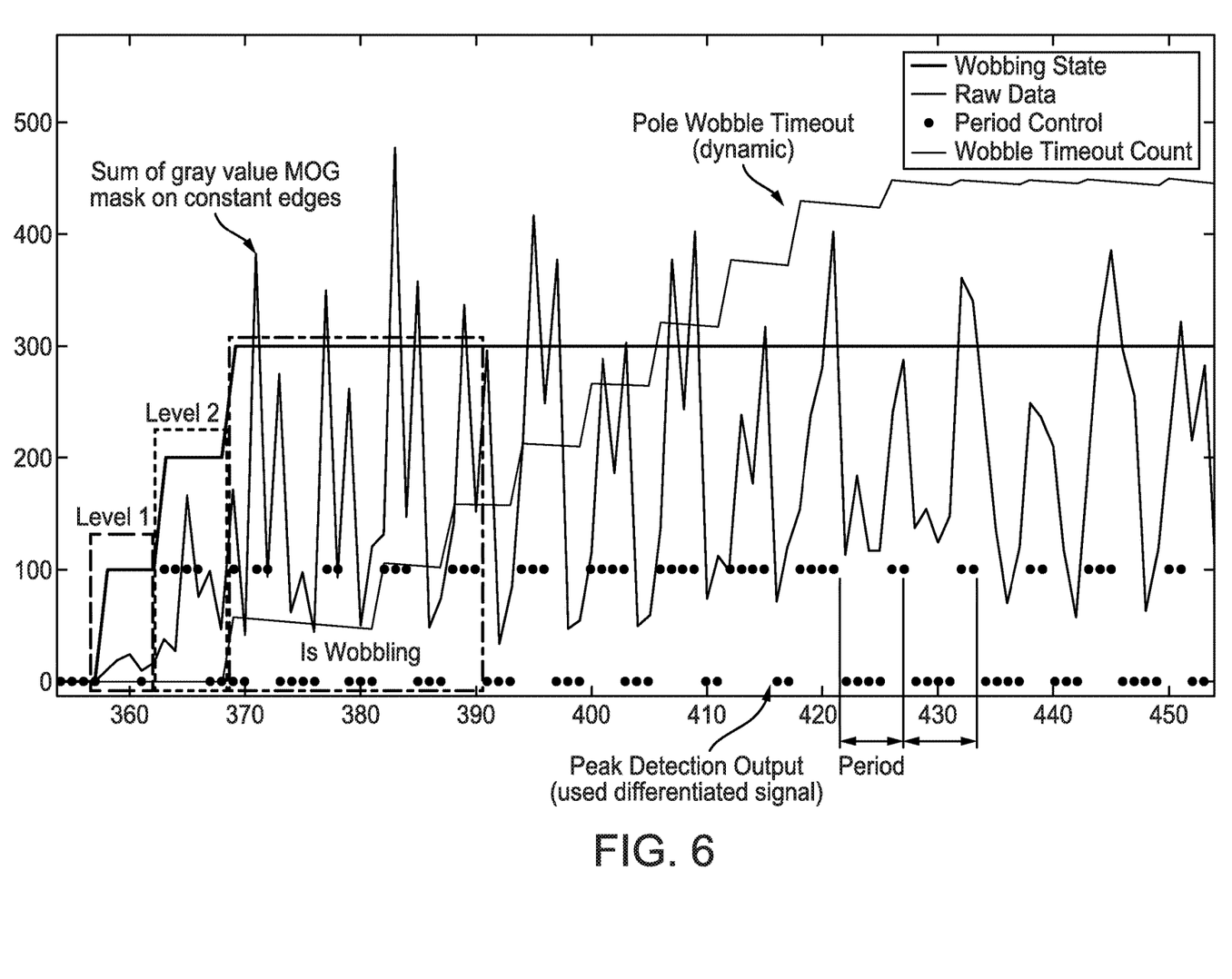
FIG. 6 is a graphical representation illustrating various steps and conditions for an algorithm in accordance with one or more embodiments.

A pole wobble detection algorithm is executed by, for example, a digital signal processor (DSP) such as DSP 416 (FIG. 4), on each incoming image frame. For each pixel in the image, a Mixture of Gaussian (MOG) value is calculated. FIG. 6 is a graphical representation of a wobble detection algorithm according to an exemplary embodiment.

During the pixel iterations, the constant edges in the image are identified using high-frequency pixel filtering. Constant edges would be generated by lines such as those created by pavement stripes, vehicle outlines and pedestrian silhouettes. The MOG Gray Value (GV) Mask pixels that are also constant edges are summed. These pixels are buffered for three frames of history. After fully processing the image through the MOG process and storing three historical frames, the GV Mask Sum is differentiated. The GV Mask Sum is normalized by the total count of constant edges within the scene. The total constant edges within the scene will be dynamic as the scene changes over time, and from scene to scene. The algorithm learns the constant edges.

Then the algorithm looks for a positive slope (e.g., a positive value in the differentiated signal data) that is above a given threshold. If a positive slope is found, a subsequent negative slope below a different given threshold is searched for. A variable indicating a Wobble State is initialized to a certain value, i.e., Level 1, which indicates the lowest amount of wobble, e.g., the pole is not swaying very much, if at all. According to further embodiments, the Wobble State value is used to adjust thresholds or delay decision logic. If a negative slope is found, another positive slope above another given threshold is searched for. This threshold can be the same or different than the initial threshold. If a positive, negative, positive slope sequence occurs within a specified period of time, then the Wobble State variable is incremented to another value, i.e., Level 2, indicating an increased probability of Pole Wobble. If a positive, negative, positive slope pattern is not found, the pole wobble detection sequence is restarted.

If the Wobble State variable has been set to Level 2, the historical data for the current period will be saved and the positive, negative, positive slope pattern will be searched for during another full period. If the pattern is found during the second period, the pole is deemed to be wobbling and a timeout is incremented. For example, a timeout is set for between zero to four seconds. The timeout is used as a hysteresis function to indicate the likelihood of pole wobble based on the historical data. As more periods are found that meet the period wobble criteria, the timeout is incremented by four seconds. The timeout is capped at a predetermined value, for example, 30 seconds. If periods are missed, the timeout is reduced by a certain amount, for example, four seconds. If the timeout reaches zero, the Wobble State value is set to Level 0 indicating "not wobbling."

If the Wobble State is greater than or equal to Level 1, some amount of pole wobble has been detected. The next step is to determine which areas in the image are affected in such a way as to compromise the detection of Motion of Interest (MOI). In those areas, the detection algorithm will be desensitized to avoid false indication of MOI. The Desense Algorithm is described below.

For all MOG GV Mask and Edge Mask pixels, the Gradient Angle of the pixel is computed. The Gradient Angle is computed and averaged (e.g., learned) over a number of frames (e.g., 5 according to the present embodiment). If the difference between the Gradient Angle of the pixel in the current frame and the learned Gradient Angle for that pixel is above a predetermined threshold, e.g., 45 degrees or greater, then the current pixel is kept as a Mask Pixel. Otherwise, the pixel is removed from the Gray Value and/or Edge Mask. If the Wobble State is less than Level 1, the Gradient Angle of the pixel is unlearned. It will be relearned next time the pole is wobbling. This decision process saves processing time when the pole is not wobbling. These steps are iterated over each pixel in the frame and the result is a Desense Mask indicating areas in the image where motion detection should be more conservative. Provisions are made to allow tuning of the algorithm parameters based on pole mounting height and other environmental factors.

The Motion Of Interest Detection process comprises several levels of categorization and evaluation of the filtered frame data. It is insufficient to rely exclusively on filtering frame regions into motion and non-motion components. Further classification of these regions and their behavior is required to significantly reduce false indication of Motion Of Interest (MOI) where there is none and no indication where there is legitimate MOI. A higher level of object discrimination, attribute assignment and tracking is necessary.

After the image data has been filtered such that areas of motion and non-motion, edges and Gray Value levels have been assigned, the Object Detection process begins. Object Detection consists of three operations, Image Segmentation, Region Building and Region Tracking.

For the Image Segmentation phase, the pixels in each image frame are divided into sub-regions based on similar MOG distribution attributes. Temporal attributes over several frames, as well as physical attributes determined in each frame are calculated and stored for each sub-region. Once the sub-regions are determined, they are evaluated for similarities in the Region Building phase. In this phase, sub-regions with similar characteristics are associated into larger regions or "blob" entities. In the next phase, Region Tracking, the behavior of each region is tracked. Characteristics including movement, size, speed, velocity and trajectory are determined in preparation for the Classification phase.

Classification is based on traversing a predetermined Decision Tree. According to one embodiment, a Decision Tree is developed by collecting a large database of various motion scenarios, identifying unique regions as described above and extracting features which describe each of the labeled regions across the whole dataset. A set of Class Labels is determined and assembled into a decision tree. The tree is then pruned based on percent misclassification error for the training and cross-validation sets for various prune levels.

During real time operation of the sensor, regions and their attributes are identified and then passed through a rating process based on the Tree Class Labels. The decision process starts at the top of the tree and moves from node to node down the branches. For example, Class Labels at the top of the Decision Tree may include "moves linearly" and "circles around a fixed point". A branch below the "moves linearly" node may include further differentiation, such as "moves faster than 20 feet per second". Lower levels of Class Labels in an unpruned tree may have been created to a high level of differentiation. For example, in the initial determination, there may be Class Labels of "moves between one and two feet per second" and "moves between two and three feet per second".

Figure 7:
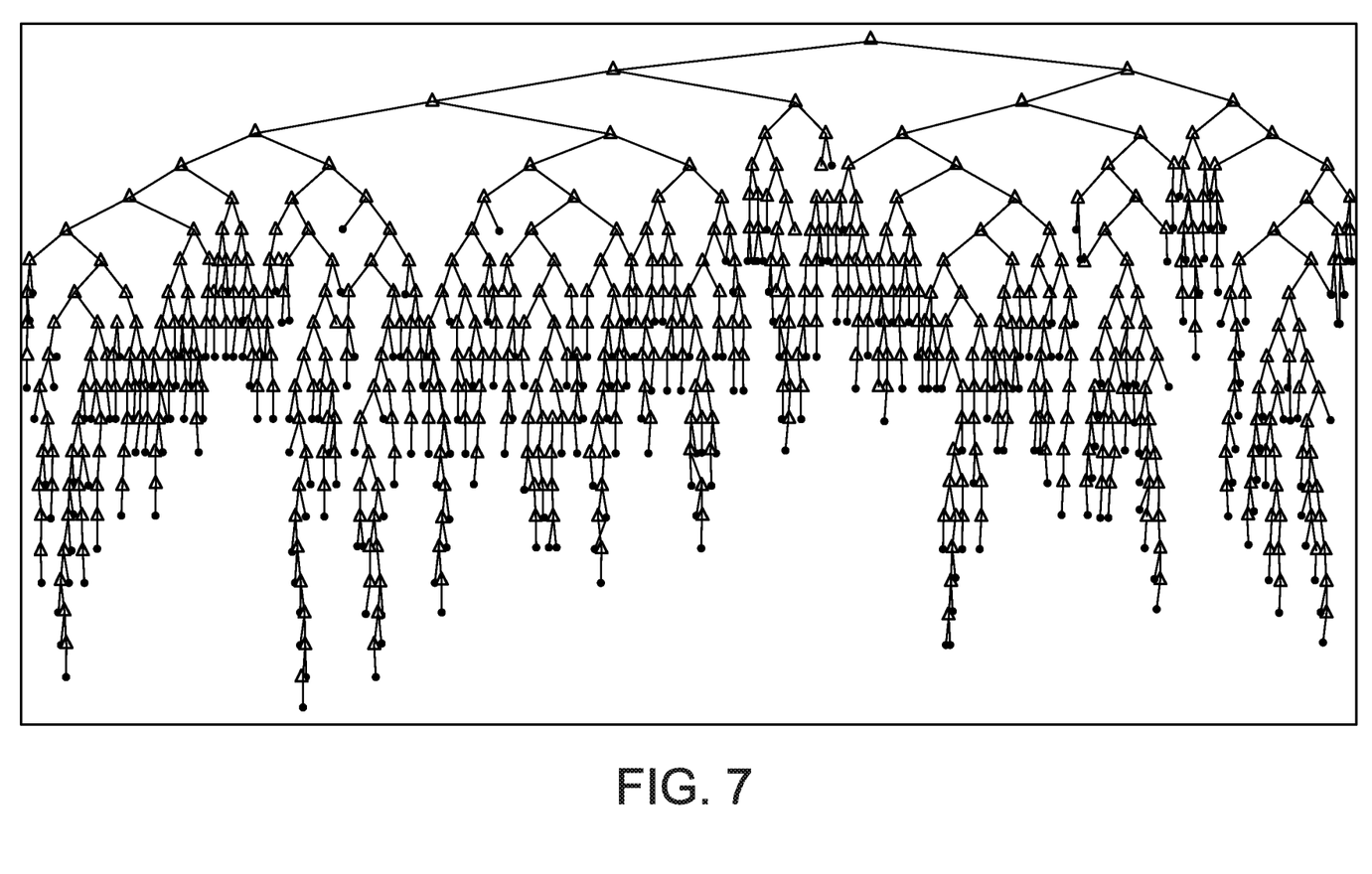
FIG. 7 is a diagram that represents an unpruned decision tree in accordance with one or more embodiments.
Figure 8:
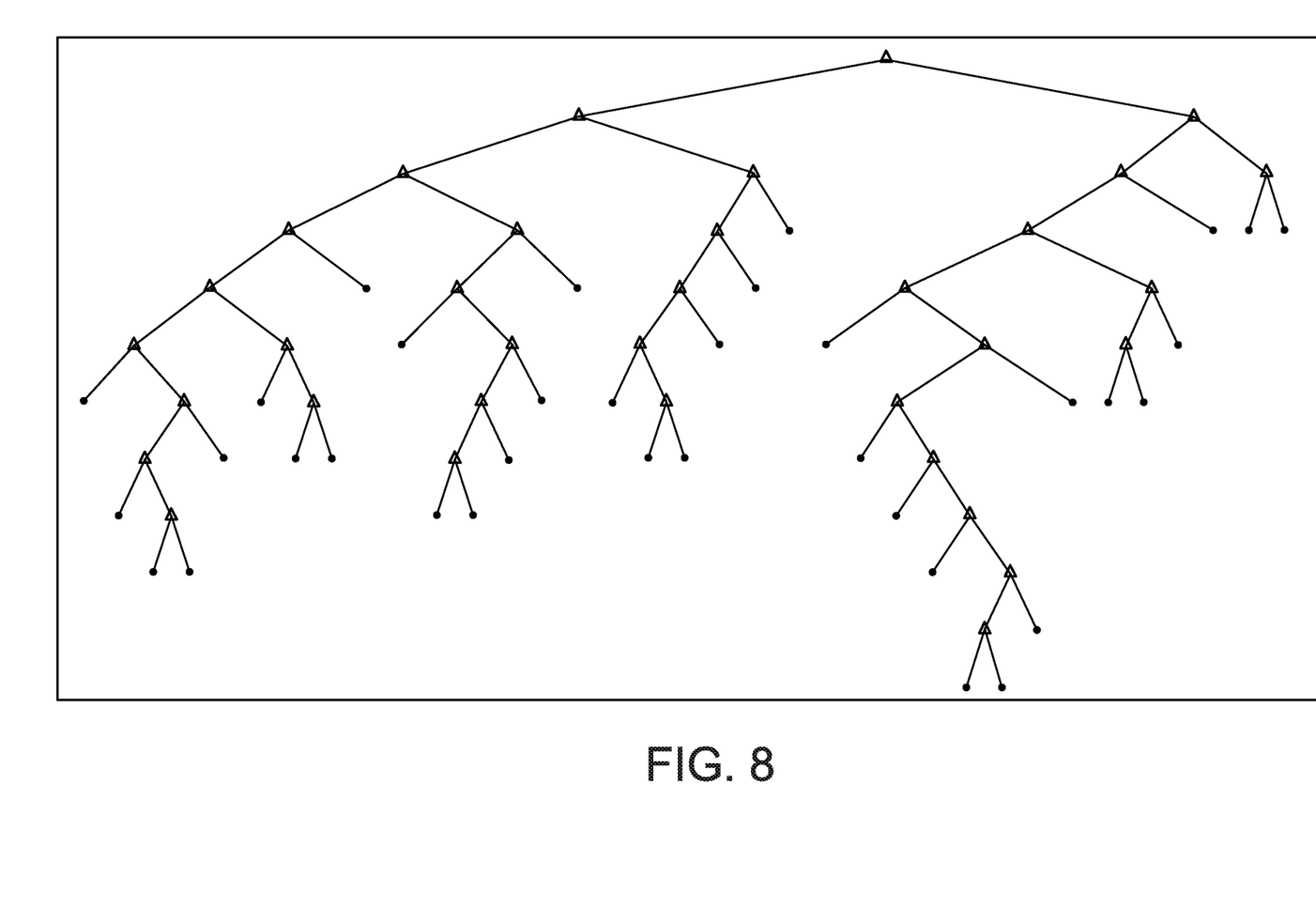
FIG. 8 is a diagram that represents an pruned decision tree in accordance with one or more embodiments.

The pruning process uses a known cross-validation dataset to evaluate the necessity and importance of each of the Class Labels. The pruning process may find for example that the differentiation of "moves between one and two feet per second" and "moves between two and three feet per second" does not produce significant improvement in the MOI decision process. These nodes may then be removed or combined. Representations of the unpruned and pruned decision trees are illustrated in FIGS. 7 and 8, respectively. It is important to note that optimum pruning is allows the best determination of MOI with the lowest amount of processing.

An additional aspect of the application is the addition of several failsafe mechanisms to turn on the lights in case the algorithms are not able to evaluate frame data. This phase is known as Extreme Scenario Detection and its goal is to prevent "sensor blindness" and default to turning on the lights. This phase comes into effect for a number of reasons. Global Illumination is an attribute representing the average illumination for the whole image frame. If this changes significantly and too frequently—in the current embodiment, 50% change within five seconds, three times in a row, the failsafe ON condition is reported. If a large percentage of the frame is significantly over-exposed or under-exposed for more than a given time, e.g., three seconds, the failsafe ON condition is reported. If there is too much activity in a sequence of frames, the failsafe ON condition is reported. In the current embodiment, a sequence is considered to have too much activity if more than 520 unique sub-regions lasting longer than five seconds are identified. Conditions that may trigger these failsafe operations include intense rain or snow and excessive pole wobble.

Although certain embodiments have been described in detail, variations and modifications exist within the scope and spirit of one or more independent aspects as described. Accordingly, the specification and figures are to be regarded in an illustrative sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A sensor fixed atop a structure, the sensor comprising:
   an image-capturing device configured to collect image data; and
   an electronic processing device configured to
      receive, via the image-capturing device, the image data,
      determine a wobble state value of the image data,
      filter the image data when the wobble state value is approximately equal to a first wobble state threshold,
      perform a first timeout for a first predetermined time period when the wobble state value is approximately equal to a second wobble state threshold, and
      increment the first timeout to a second timeout for a second predetermined time period when the wobble state value is approximately equal to the second wobble state threshold following the first timeout.

2. The sensor recited in claim 1, wherein the electronic processing device is further configured to determine whether the sensor is moving based on the filtered image data.

3. The sensor recited in claim 2, wherein the electronic processing device is further configured to determine whether an apparent motion detection is the result of an actual but irrelevant motion.

4. The sensor recited in claim 3, wherein said actual but irrelevant motion corresponds to movement of a non-human.

5. The sensor recited in claim 4, wherein said non-human includes one or more of an insect and a plant.

6. The sensor recited in claim 1, wherein a processing time related to the algorithm is decreased as a result of said processing device learning at least one attribute of the image data.

7. The sensor recited in claim 1, wherein the structure is a light pole.

8. The sensor recited in claim 1, wherein the electronic processor is further configured to control a lighting device based on the filtered image data.

9. A method of controlling the operation of a lighting device fixed atop a structure, the method comprising:
   capturing image data using a sensor module;
   performing, via an electronic processing device, filtering data related to a wobbling event of the structure when a wobble state value is approximately equal to a first wobble state value,
   performing, via the electronic processing device, a first timeout for a first predetermined time period if the wobble state value is approximately equal to a second wobble state value, and increment the first timeout to a second timeout for a second predetermined time period if the wobble state value is approximately equal to the second wobble state value after the first timeout;
   determining if the lighting device and structure are wobbling based on the process;
   indicating whether a motion of interest has occurred based on a result of said determining; and
   controlling said lighting device based on said indication of the motion of interest.

10. The method of claim 9, wherein a processing time related to performing the process is decreased as a result of said processing device learning at least one attribute of the image data.

11. The method of claim 9, further comprising, determining, via the electronic processing device, whether a motion is detected based on the process.

12. The method of claim 11, wherein said motion includes irrelevant motion.

13. The method of claim 12, wherein said irrelevant motion corresponds to movement of a non-human.

14. The method of claim 13, wherein said non-human includes one or more of an insect and a plant.

15. The method of claim 9, wherein a processing time related to the algorithm is decreased as a result of said processing device learning at least one attribute of the image data.

16. The method of claim 9, wherein the structure is a light pole.

17. The method of claim 9, further comprising controlling, via the electronic processing device, a lighting device based on the filtered image data.

\* \* \* \* \*